Nov. 22, 1949        G. HERZOG        2,489,133
RADIATION DETECTING DEVICE
Filed Nov. 10, 1944        2 Sheets-Sheet 1
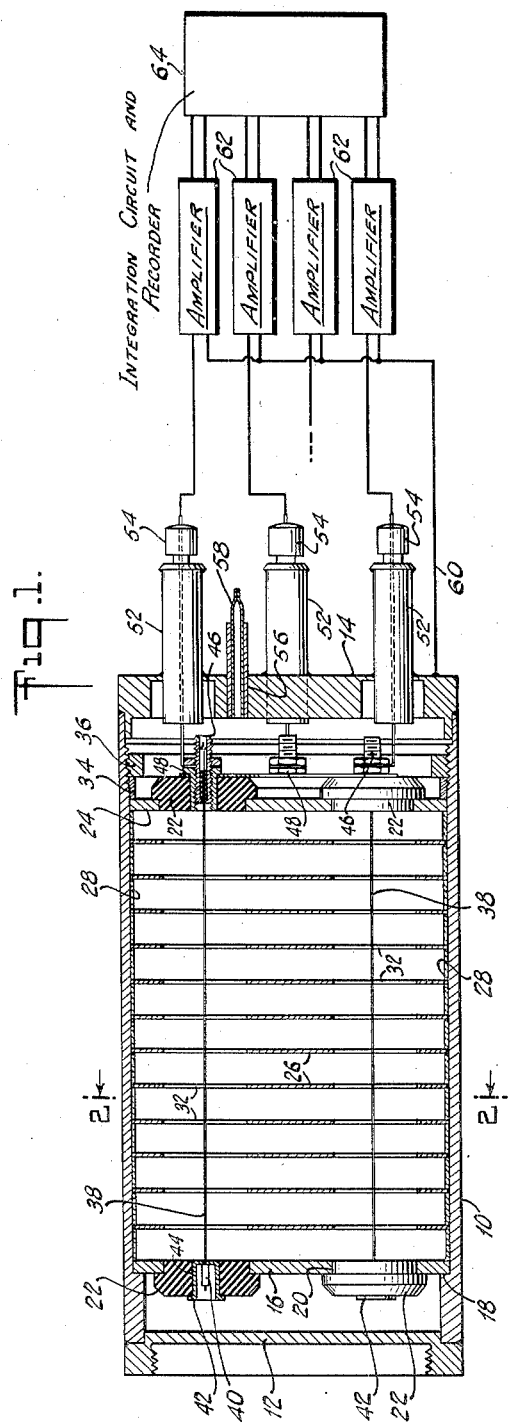
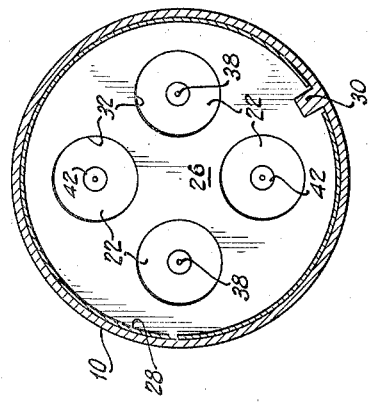
INVENTOR
GERHARD HERZOG
BY *Daniel Stryker*
ATTORNEY

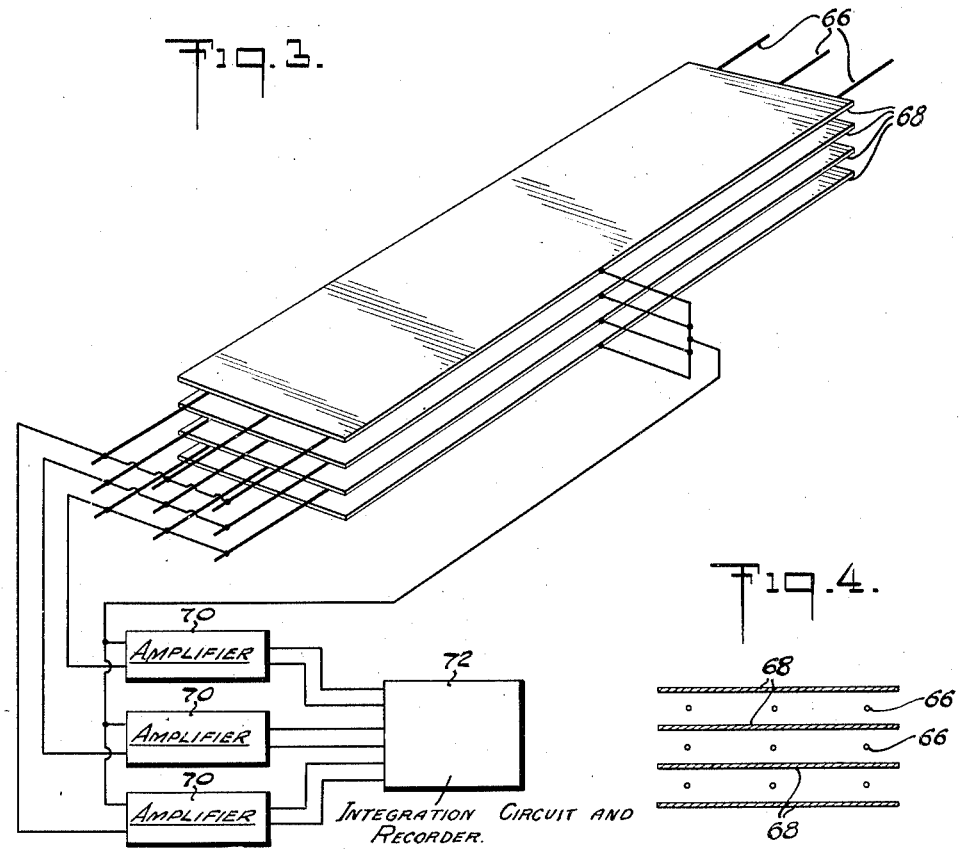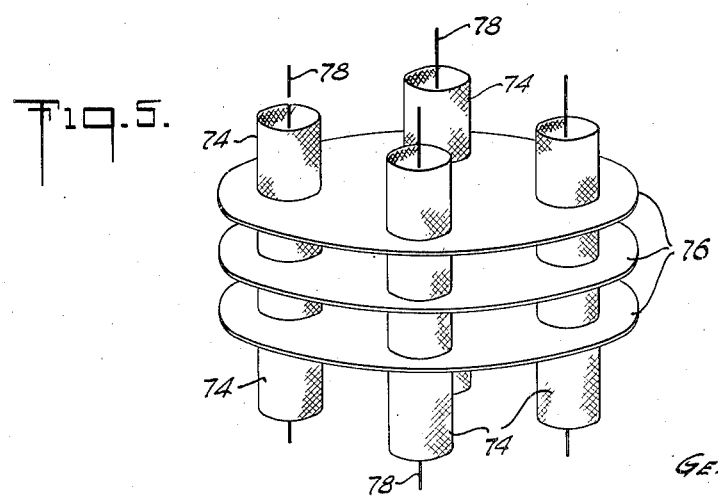

Patented Nov. 22, 1949

2,489,133

UNITED STATES PATENT OFFICE 2,489,133

RADIATION DETECTING DEVICE

Gerhard Herzog, Houston, Tex., assignor to The Texas Company, New York, N. Y., a corporation of Delaware Application November 10, 1944, Serial No. 562,870

9 Claims. (Cl. 250—83.6)

1

This invention relates to radiation detecting devices and more particularly to a device of the counter type for detecting and measuring penetrative radiation such as gamma rays. The principal object of the invention is the provision of a gamma ray detecting device having a high counting rate, i. e., a device capable of providing clear and distinct pulses or counts without blurring even when the pulses occur at a rate of many thousands per second.

In the measurement of the thickness of plates or tube walls or of the density of substances in accordance with the methods disclosed, for example, in the U. S. Letters Patents to Hare, No. 2,277,756 and No. 2,304,910 granted March 31, 1942, and December 15, 1942, respectively, wherein penetrative radiation from a source such as radium is diffused within the object being measured, part of the diffused radiation being scattered back to a detector such as a Geiger counter disposed near the source and at the same side of the object as the source, the speed with which measurements may be made is somewhat dependent upon the size of the radiation source. However, there are limitations to the size of the source since when the counting rate becomes too high the pulses occur so rapidly that they become overlapped and cannot be distinguished.

In the U. S. Letters Patent of D. G. C. Hare and Gerhard Herzog, No. 2,397,073, granted March 19, 1946, and D. G. C. Hare No. 2,397,071, granted March 19, 1946, radiation detectors or counters are described in which a plurality of wires are disposed either between adjacent pairs of spaced, parallel cathode plates or through aligned holes in a bank of separated, parallel cathode plates, the wires being connected together electrically to form the anode of the counter. Counters of this type are many times more efficient than the conventional Geiger-Müller counter having a single anode passing through the longitudinal axis of a cylindrical cathode but since the pulses from the improved counter are the sum of the pulses from the plurality of anode wires they sometimes become indistinguishable when the counting rate is very fast.

In accordance with the invention a radiation detector or counter has been provided along the lines of those described in the aforementioned Patents, Nos. 2,397,073 and 2,397,071, but in which the anode wires are electrically insulated from each other, singly or in groups and either the separate wires or groups of wires are connected to individual amplifiers. The common cathode is connected to each amplifier. Thus the pulses from each wire or from predetermined groups of wires are separately amplified and are then fed from the amplifiers to a suitable indicating or recording device such as a mechanical counter or an integrating circuit. It has been found that

2 with such an arrangement clear and easily distinguishable pulses or counts can be recorded, even when the counting rate is of the order of several thousand per second.

As a modification, a detector will be described in which a plurality of slightly separated parallel cathode plates are provided with several series of aligned holes and in which tubes or cylinders of wire mesh are disposed through the several series of holes. These mesh tubes and the cathode plates are all connected together electrically to form a common cathode. An anode wire is mounted along the longitudinal axis of each tube, the wires being insulated from each other, or if desired, connected in groups to individual amplifiers as has been described. The mesh tubes not only increase the effective cathode area but also serve to prevent capacity coupling between the several anode wires.

For a better understanding of the invention reference may be had to the accompanying drawings in which Fig. 1 is a longitudinal sectional elevation through one type of detector embodying the invention;

Fig. 2 is a sectional view of the detector on the line 2—2 of Fig. 1;

Fig. 3 is a somewhat diagrammatic, isometric view of the cathode and anodes of a counter in which the anode wires are parallel to the cathode plates;

Fig. 4 is a cross section through the counter of Fig. 3; and

Fig. 5 is a view of a modified form of detector.

Referring to the drawing, particularly to Figures 1 and 2, a cylindrical casing 10 having end closure plates 12 and 14 is shown as housing the essential parts of a detector or counter. The casing 10 may be of brass although any other suitable metallic or non-metallic material may be used. Within the casing and near one end is a circular disc 16 resting against a shoulder 18 formed in the casing 10 and provided with a plurality of holes 20, four in this instance, in which insulating members or buttons 22 are disposed. Near the other end of the casing 10 is another disc 24 similar to the disc 16 and provided with similar holes containing additional insulating members 22. Within the space between the discs 16 and 24 are mounted a plurality of cathode plates or sheets 26, these plates being secured in position and spaced apart by means of separator rings 28. As shown more clearly in Fig. 2 the casing is provided with a key 30 and the rings 28 and the cathode plates 26 are provided with notches or openings corresponding substantially to the shape of the key. By this means proper alignment of the cathode plates is secured and maintained. Each cathode plate is provided with holes 32 corresponding in number to those in the discs 16 and 24, the holes in the bank of plates being aligned in several series. A spacer ring 34 is placed at the outside periphery of the plate 34 and a threaded ring 36 is adapted to be screwed into the end of the casing so as to compress and lock the discs 16 and 24, the cathode plates 26, and the separator rings 28 in a rigid position.

Stretched through each series of holes 32 in the cathode plates 26 is a fine wire 38 comprising an anode. In viewing Fig. 1 the left hand end of each wire 38 is provided with an enlargement 40 which is housed within and bears against the bottom of a cup-shaped member 42 fitted within a hole 44 in each of the insulating buttons 22. The other end of each wire 38 is also provided with an enlargement 40 housed within an exteriorly threaded, elongated cup 46 adapted to be screwed into a cup 48 fitting within a hole in each insulating button 22. Between the enlargement 40 at the right-hand end of each anode wire and the bottom of each cup 46 is a small compression spring 50. It is preferred that a definite tension be maintained on each anode wire 38 and with the parts so far described this tension is placed on the wires in the following manner: The parts are assembled substantially as shown in Fig. 1 and the cup 46 is engaged by a suitable tool and pulled toward the right until the wire is under the desired tension. The cup 46 is held in that position while the cup 48 is screwed toward the left and until its enlarged head engages the insulating button 22. The wire 38 will then remain under the desired tension.

The end plate 14 is provided with a plurality of insulated bushings 52, one for each anode wire and a connection is made between a metal cap 54 on the end of each bushing and its respective anode wire. The end plate 14 is also provided with an opening 56 in which is mounted a small tube 58 through which the interior of the counter can be filled with a suitable gas such as a mixture of argon and petroleum ether. After the end plate 14 has been secured to the casing 10 as by welding or soldering and the gaseous filling placed in the casing the end of the tube 58 is crimped so as to seal the interior of the detector.

As shown somewhat diagrammatically in Fig. 1 the bank of cathode plates is connected as by means of a wire 60 to an input terminal of each of a plurality of amplifiers 62. The other input terminal of each amplifier is connected to one of the anode wires 38 and the outputs of the several amplifiers may be connected to a suitable recorder 64 which may comprise a suitable integration circuit.

It is understood that a potential of approximately 1000 volts is maintained across the cathode bank and each of the anode wires and that the gas pressure within the detector will be of the order of two thirds of one atmosphere. A gamma ray striking one of the cathode plates 38 may cause an electron to be ejected from the plate to cause ionization of the gas, and an electrical pulse will be produced which will be amplified by one of the amplifiers 62 and conducted to the recorder 64. Although four anodes are shown in Figs. 1 and 2, either more or less may be used, this depending somewhat on the diameter of the cathode plates.

In Fig. 3 is shown rather diagrammatically an embodiment of the invention in which a plurality of groups of anode wires 66 are stretched parallel to and between adjacent pairs of elongated cathode plates 68. It is understood that the cathode bank and the anode wires will be mounted within a suitable envelope or casing, not shown, containing an ionizable gas. Each group of three anode wires 66 is shown as connected together and to one of the amplifiers 70, the cathode bank 68 also being connected to the input of each of the amplifiers. As was the case with reference to the embodiment shown in Fig. 1, the outputs of the amplifiers 70 are led to a suitable recorder 72.

In Fig. 5 still another embodiment is disclosed somewhat diagrammatically, this construction being similar to that of the detector of Figs. 1 and 2 but with the addition of a tube or cylinder 74 of fairly fine wire mesh or gauze disposed within each series of holes in the cathode plates 76. It has been found that gauze of 60 to 100 mesh copper wire is very satisfactory although other sizes and materials can be used. If desired, the diameter of the tubes 74 can be such that the tubes will fit snugly within the holes. However, it may be found desirable to use mesh tubes or cylinders of a somewhat smaller diameter and to support them so that they will be maintained concentric with the holes of the plates. The tubes 74 and the plates 76 are, of course, connected electrically to form the cathode. An anode wire 78 is disposed along the longitudinal axis of the tubes 74 and the entire unit is mounted within a suitable envelope or casing, not shown. As has been described with reference to Figs. 1 through 4, each anode wire 78 is connected to the input of a separate amplifier, the other side of the input of the amplifier being connected to the cathode bank 76. The provision of the mesh tubes or cylinders 74 increases the effective cathode surface of the counter and each tube also serves to shield its respective anode from the anodes in the unit. In the embodiment disclosed shown in Figs. 3 and 4 each group of anode wires 66 is shielded from the other groups by the adjacent cathode plates and thus capacity coupling is prevented or minimized.

It is to be understood that instead of each anode wire being connected to a separate amplifier, as shown in the embodiments of Figs. 1 and 5, two or more of the anode wires can be connected together in a group and then to the input of one amplifier. Likewise it may be found desirable to connect one or two of the wires of each group of three shown in Figs. 3 and 4, to a separate amplifier.

It will be seen that the pulses from each anode or groups of anodes are separately amplified by its respective amplifier so that clear and distinct counts will be recorded without overlapping or confusion which would otherwise occur when the counting rate is high and where the anodes are all connected together so that all of the pulses must be amplified in one amplifier. By utilizing a detector embodying the invention described to measure radiation from a source scattered within an object, the thickness of which it is desired to ascertain, a relatively large source of radiation can be used with an attendant increase of the speed of making the measurements.

Obviously many modifications and variations of the invention, as hereinbefore set forth, may be made without departing from the spirit and scope thereof, but only such limitations should be imposed as are indicated in the appended claims.

I claim:

1. A radiation detecting device comprising a casing, a plurality of plates disposed in a bank in said casing in separated relation and connected together electrically to form a cathode member, said bank of plates being provided with a plurality of series of holes, the holes in each series being disposed in alignment, a wire comprising an anode disposed on the longitudinal axis of each series of holes, said anode wires being insulated from each other, a plurality of amplifiers, said cathode member and one of said wires being connected to the input of each of said amplifiers and recording means connected to receive the output of all said amplifiers.

2. A radiation detecting device comprising a closed housing, a plurality of thin metal plates disposed in said housing in parallel, separated relation in a bank and connected together electrically to form a cathode, said bank of plates being provided with a plurality of series of holes, the holes in each series in alignment, a fine wire forming an anode disposed through each series of holes, a separate amplifier connected to each anode wire and to said cathode, and a common integrating circuit connected to receive the output of said amplifiers.

3. A device for detecting gamma radiation comprising a housing, a plurality of plates in said housing arranged in a parallel bank and connected together electrically to form a cathode, the plates being separated slightly to form spaces therebetween and said bank of plates being provided with a plurality of holes disposed in parallel lines extending transversely through said bank, an anode wire extending through the center of each line of holes, a gaseous filling in said housing, said filling comprising mainly argon and a small amount of petroleum ether, a separate amplifier connected to each of said anode wires and to said cathode, and means for recording the composite output of said amplifying means.

4. A radiation detecting device comprising a closed housing, a plurality of thin metal plates disposed in said housing in parallel, separated relation in a bank and connected together electrically to form a cathode, a plurality of fine wires forming anodes disposed in proximity to said cathode plates, a separate amplifier connected to each anode wire and to said cathode, and an integrating circuit connected to receive the output of said amplifiers.

5. A radiation detecting device comprising a casing, a plurality of plates disposed in a bank in said casing in separated relation and connected together electrically to form a unitary cathode member, a plurality of wires comprising anodes disposed in the space between and parallel to adjacent pairs of cathode plates, said anode wires being insulated from each other, a plurality of amplifiers, said cathode member and the anode wires between each pair of cathode plates being connected to the input of a different one of said amplifiers and recording means connected to receive the output of all said amplifiers.

6. A device for detecting gamma radiation comprising a housing, a plurality of thin metal plates in said housing arranged in a parallel bank, said plates being separated slightly to form spaces therebetween and said bank of plates being provided with a plurality of holes disposed in parallel lines extending transversely through said bank, a tubular member of wire mesh extending through each line of holes and in contact with the periphery of each hole in a line, said bank of plates and said tubular members forming a unitary cathode, and an anode wire disposed on the longitudinal axis of each tubular member.

7. A device for detecting gamma radiation comprising a housing, a plurality of thin metal plates in said housing arranged in a parallel bank, said plates being separated slightly to form spaces therebetween and said bank of plates being provided with a plurality of holes disposed in parallel lines extending transversely through said bank, a tubular member of wire mesh extending through each line of holes and in contact with the periphery of each hole in a line, said bank of plates and said tubular members forming a unitary cathode, an anode wire disposed on the longitudinal axis of each tubular member, a separate amplifier connected to said cathode and to one or more of said anode wires, and common means for recording the output of said amplifiers.

8. A device for detecting gamma radiation comprising a housing, a plurality of thin metal plates in said housing arranged in a parallel bank, said plates being separated slightly to form spaces therebetween and said bank of plates being provided with a plurality of holes disposed in parallel lines extending transversely through said bank, a tubular member of wire mesh extending through each line of holes and in contact with the periphery of each hole in a line, said bank of plates and said tubular members forming a unitary cathode, an anode wire disposed on the longitudinal axis of each tubular member, a gaseous filling in said housing, said filling comprising mainly argon and a small amount of petroleum ether, a separate amplifier connected to said cathode and to each of said anode wires, and common recording means for the outputs of said amplifiers.

9. In radiation counting equipment having a unitary cathode and a plurality of anodes substantially coextensive with said cathode, the combination which comprises a plurality of amplifiers connected respectively to the anodes and also to the cathode for separately amplifying pulses produced in the respective anodes, a pulse indicating device and means for feeding the outputs of the several amplifiers to the pulse indicating device.

GERHARD HERZOG.

REFERENCES CITED

The following references are of record in the file of this patent:

UNITED STATES PATENTS

| Number | Name | Date |
| --- | --- | --- |
| 2,220,509 | Brons | Nov. 5, 1940 |
| 2,322,634 | Howell | June 22, 1943 |
| 2,332,873 | Silverman | Oct. 26, 1943 |
| 2,349,753 | Pontecorvo | May 23, 1944 |
| 2,370,162 | Hare | Feb. 27, 1945 |
| 2,383,477 | Friedman | Aug. 28, 1945 |
| 2,391,093 | Howell | Dec. 18, 1945 |
| 2,397,071 | Hare | Mar. 19, 1946 |
| 2,397,661 | Hare | Apr. 2, 1946 |

OTHER REFERENCES

Copp and Greenberg, Review of Scientific Instruments, vol 14, No. 7, July 1943, pp. 205 and 206.